United States Patent [19]

Lewis et al.

[11] Patent Number: 4,959,444
[45] Date of Patent: Sep. 25, 1990

[54] REACTION INJECTION MOLDABLE (RIM) THERMOSET POLYIMIDE, AND POLYKETONE ELASTOMERS

[75] Inventors: Charles M. Lewis, Springfield, Mo.; Nasser Pourahmady, Ridgeville, Ohio

[73] Assignee: Dayco Products, Inc., Dayton, Ohio

[21] Appl. No.: 241,168

[22] Filed: Sep. 2, 1988

[51] Int. Cl.$^5$ .............................................. C08G 79/00
[52] U.S. Cl. .................................. 528/170; 254/328.1; 254/328.6; 254/328.8; 528/184; 528/288
[58] Field of Search ..................... 528/170, 184, 288; 264/328.1, 328.6, 328.8

[56] References Cited

U.S. PATENT DOCUMENTS 4,760,124  7/1988  Matsumura et al. ................. 528/170

Primary Examiner—Maurice J. Welsh
Attorney, Agent, or Firm—Joseph V. Tassone

[57] ABSTRACT

A polyimide having a repeating unit of the formula (I), (II), or (III):

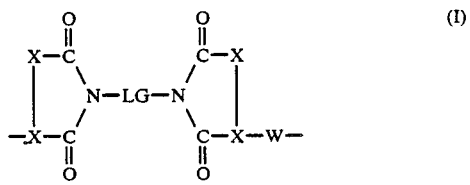

(I)

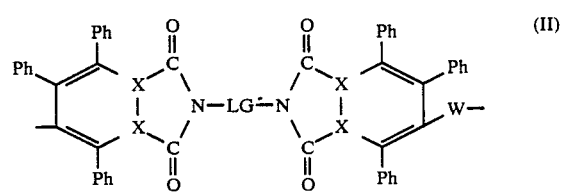

(II)

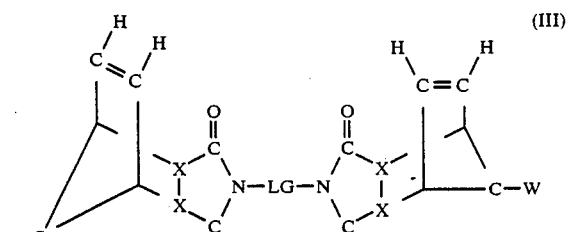

(III)

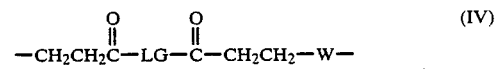

(IV)

where LG is a linking group and W is an oligomeric chain selected from the group consisting of polyether, a polythioether, a polyetherthioether, polycarbonyl, or polysulfonyl, or a copolymer thereof.

27 Claims, No Drawings

REACTION INJECTION MOLDABLE (RIM) THERMOSET POLYIMIDE, AND POLYKETONE ELASTOMERS

BACKGROUND OF THE INVENTION

The present invention relates to temperature resistant thermoset plastic polyimide, and polyketone elastomers and more particularly to thermally stable thermoset plastic polyimides, and polyketone elastomers useful in automotive power transmission belts which are reaction injection molded.

The temperature requirements for engine accessory drive belts have increased so dramatically that conventional elastomers, used to fabricate power transmission belts, are not adequate for tomorrow's automobiles.

The obvious solution would be to incorporate new fabricating technology and materials into a totally new method of manufacture for power transmission belts. This is what led us to RIM processing, short for Reaction Injection Molding. This is not to be confused with the Injection Molding process which is widely used today to make thermoplastic molded parts. The Thermoplastic Injection Molding machine simply melts the plastic and injects it into a cold mold were it hardens and assumes the desired shape of the mold. These plastics can be processed over and over again by remelting, and injecting them into new molds.

The RIM machine meters two chemically reactive liquids, commonly designated as "A" and "B" reactants, in a precise volumetric ratio to a impingement mixer at near sonic velocity. The reacting liquid chemicals are then injected into a low pressure mold before they have had sufficient time to polymerize into a solid plastic. The resulting polymer is a fully crosslinked thermoset plastic of enormous molecular weight that can never be reprocessed again, it will thermally degrade before melting.

The key to the process is in the word "REACTION", i.e., (Chemical Reaction). The polymer is polymerized, created insitu, in the mold by the spontaneous chemical reaction of two liquid oligomer systems with each other. I use the term oligomer system because neither the A or B side is a completely finished polymer. The A and B components are blended chemical intermediates which are liquid and have no chemical reactive to themselves at the processing temperature. The two oligomer intermediates do, however, react very aggressively with each other upon mixing. Typical reaction times of 0.2 to 1 second are not uncommon. Finished, completely cured parts are commonly molded in 5 to 10 minutes.

Polymer technology has not kept pace with RIM technology. There a number of RIM polyurea and polyurethane materials which satisfy the basic physical characteristics required in these applications, namely, tensile strength, flexural modulus, hardness, and elongation. In addition, they have superior dynamic properties over conventional millable gum elastomers such as Neoprene, Hycar, and Hypalon. They do not, however, have the temperature resistance necessary for automotive power transmission belts.

Thermal degradation studies conducted on these elastomers clearly show the thermally weak part to be the urethane or urea linkage. The polymer backbone structures are capable of with standing much higher temperatures. The polythioether backbones are stable to about 600° F., aliphatic polyethers are stable to about 670° F., and aromatic polyethers are stable at temperatures in excess of 700° F. Oligomeric diamines used to formulate polyureas would satisfy all the requirements for power transmission belts if a more heat resistant chemical linkage could be found. It would also satisfy all of the manufacturing requirements if the new chemical linkage would form insitu by RIM processing. In accordance with the present invention, these oligomeric prepolymers are terminated by a maleimide, citraconimide, triazolinedione, or vinylketone and the conventional linkages of the polyurethane or polyurea have been replace by a much more stable linkage formed by Michael addition or Diels Alder reaction with these moieties.

Polymers formed by Michael (nucleophilic) addition of a bismaleimide are known in the art. White, J. E. et. al., "Reactions of Diaminoalkanes with Bismaleimides: Synthesis of Some Unusual Polyimides," J. Appl. Poly Sci., 29, 891-99 (1984) discloses that polyimide elastomers can be obtained by reacting diaminoalkanes having flexible backbones with aliphatic and aromatic bismaleimides. Examples of the diaminoalkanes are 1,8-diaminooctane, N,N-dimethyl-1,6-hexanediamine.

U.S. Pat. No. 3,741,942 to Crivello (1973) teaches a polyimide obtained by reaction of a bismaleimide and a dithiol, however, these polyimides, while temperature resistant, do not have the other physical properties required for use in automotive power transmission belts and there is no disclosure of RIM processing of the polyimides.

Bismaleimides have also been used to crosslink unsaturated rubbers as described in U.S. Pat. No. 2,989,504 to Little (1961), and they have been reacted with diamines by Michael addition in making fibers and molded articles as described in U.S. Pat. No. 2,818,405 to Kovacic (1957), U.S. Pat. No. 3,658,764 to Lyon (1972), U.S. Pat. No. 3,767,626 to Bron (1973), and U.S. Pat. No. 3,878,172 to Bargain et al. (1975), and re 29,316 to Bargain et al. (1976).

U.S. Pat. No. 3,738,967 to Crivello (1973) teaches that polyimides can also be prepared by a nucleophilic addition reaction of a bismaleimide and hydrogen sulfide. These polyimides are disclosed as being useful in molding, insulation, and coating. Another class of polyimide is obtained by reacting a bismaleimide with a diamine and then a sulfide or dithiol according to U.S. Pat. No. 3,766,138 to Crivello (1973).

SUMMARY OF THE INVENTION

A principal object of the present invention is to provide a thermally stable elastomer having the requisite performance characteristics for use in power transmission belts.

Another object of the present invention is to provide a thermally stable elastomer which can be prepared and molded by reaction injection molding.

A further object of the present invention is to provide liquid oligomers with bismaleimide, biscitraconimide, bistriazolinedione, or bisvinylketone terminations which are useful in reaction injection molding to provide thermally stable elastomeric articles.

A still further object of the present invention is to provide thermally stable power transmission belts which are prepared using the elastomers' described herein.

Another object of the present invention is to provide a reaction injection moldable bismaleimide, biscitraconimide, bistriazolinedione, or bisvinylketone oligomeric prepolymer.

Another object of the present invention is to provide a process for reaction injection molding wherein the bismaleimide, biscitraconimide, bistriazolinedione, or bisvinylketone terminated prepolymers described herein are reacted with a dinucleophile to prepare articles of the temperature resistant elastomers described herein.

These and other objects are achieved in the present invention which provides:

A polyimide having one of the following repeating units in the formula.

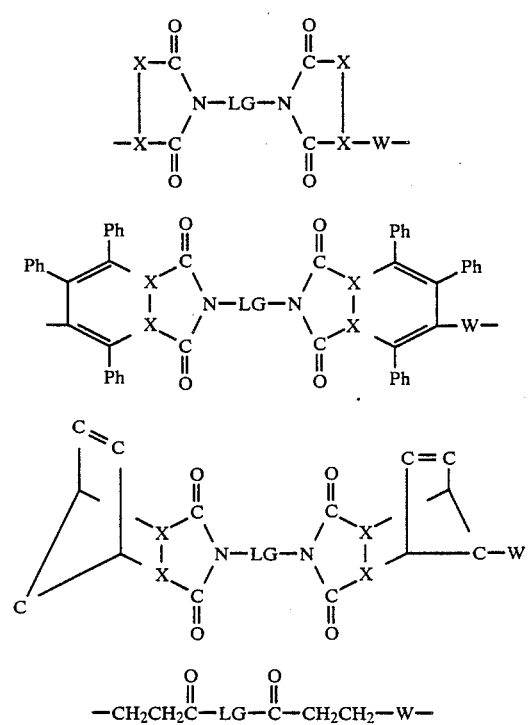

where W is a member selected from the group consisting of a polyether, polythioether, polyetherthioether, polycarbonyl, or a copolymer thereof; and more particularly

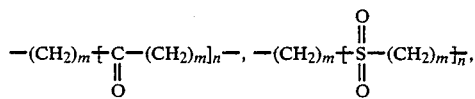

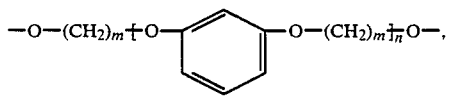

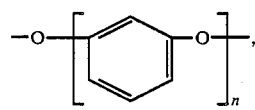

x is a carbon or nitrogen atom and when
x is a carbon atom, one carbon atom may be substituted by a methyl group;
m is 1 to 12 and preferably 4 to 12;
n is 1 to 5;

where LG is a linking group and preferably a group of the formula:

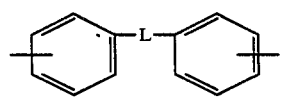

Where L represents a flexible linking group and more particularly a group having one of the following structures:

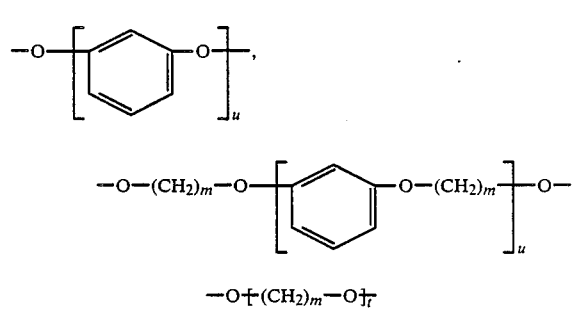

Where u is 1 to 7 and preferably 1,3, or 7; t is 1 to 5 and preferably 1 or 3.; m is 1 to 12 preferably 4 to 12;

The linking group LG and L are usually divalent, however, trivalent and tetravalent linking groups such as

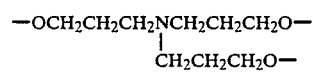

tris (3-etherpropyl) amine and

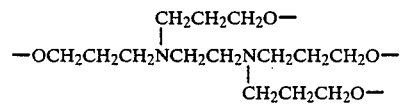

N,N,N',N',-tetrakis(3-etherpropyl)ethylenediamine are also possible. When the linking group is trivalent or tetravalent, the A component may contain 3 or 4 bismaleimido or like groups. It is douhtful that the latter linking groups would be used since it would be more expedient to introduce crosslinking into the polymer by using a polyvalent dinucleophile.

W represents a oligomer of between 500 and 6,000 in molecular weight. It can be an aliphatic polyether, polythioether, polyetherthioether, or a poly-metaphenylether. W may also represent a co-polymer of two or more of these moieties. When W is a branched chain moiety, there may be 2 to 4 reactive terminal groups.

A bismaleimide, biscitraconimide, bistriazolinedione, and bisvinylketone terminated oligomeric prepolymer with one of the following formula.

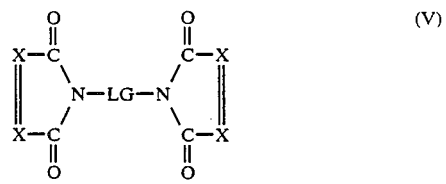

-continued

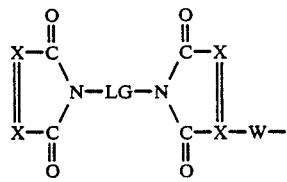
(VI)

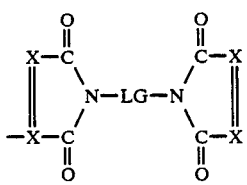

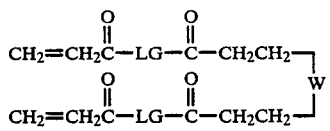
(VII)

A temperature resistant elastomer prepared by reacting a bismaleimide, biscitraconimide, bistriazolinedione, or bisvinylketone terminated prepolymer of the formulas (V)-(VII) with a dinucleophile in a Michael Addition or a Diels Alder Addition polymerization.

DETAILED DESCRIPTION OF THE INVENTION

Temperature resistant elastomeric polyimides in accordance with the present invention are prepared by reacting any of the prepolymers of formulas (V)-(VII) above with a dinucleophile in a Michael addition or Diels Alder reaction.

A particular advantage of the present invention is that the prepolymers of the formulas (V)-(VII) are useful in reaction injection molding. Hereinafter, the prepolymers of the formulas (V)-(VII) will be referred to as the "A component" and the dinucleophile will be referred to as the "B component".

In reaction injection molding, it is essential that both the A and B components be liquid under the RIM conditions and that one of the components be a low molecular weight material with a high degree of molecular mobility. This is important for two reasons. If one reactant is not a low molecular weight reactant (for example, having a molecular weight less than 1200), the reaction does not proceed quickly. Molecular mobility on the part of at least one component is required for high reactivity. In addition, if both reactants have high molecular weights, a solid reaction product is obtained after only one or two addition reactions. Once a solid product is produced the reaction shuts down prematurely, as a result the polymer will have a poorly developed matrix and relatively low molecular weight. Accordingly, to achieve the reactivity and polymer properties desired in a RIM process, at least one reactant must have good molecular mobility, the reaction must reach completion, and the high molecular weight of the polymer must be the result of the RIM reaction. It can not be achieved by using high molecular weight, in excess of 6,000, A or B components.

In accordance with the present invention, two approaches have been adopted with respect to the design of component A. Formula (V) represents bismaleimides, biscitraconimides and bistriazolinediones which are liquid under the RIM reaction conditions. Due to the symmetry of these compounds, there is a tendency for the compounds to be crystalline solids. In accordance with the present invention, however, the compounds are designed with a flexible linking group L between the maleimide moieties which places a sufficient internuclear distance between the rings and provides sufficient flexibility to the molecule that the compounds are liquid under the RIM reaction conditions.

In order to provide sufficient flexibility and internuclear distance in prepolymers of the formula (V), L is preferably an aromatic ether group, an aliphatic ether group or aromatic ether groups alternating with short aliphatic chains. The aliphatic chains between ether linkages preferably having 4 to 12 carbon atoms. The aromatic ether preferably includes a meta substituted phenylene as opposed to a para substituted phenylene because meta substitution provides substantially lower melting points in the A component and much greater flexibility to the linking group.

A second approach to designing component A is to end cap a high temperature resistant liquid prepolymer with a low molecular weight bismaleimide, biscitraconimide, bistriazo-linedione or bisvinylketone. Prepolymers in accordance with this embodiment of the invention are represented by the formulas (VI) and (VII).

Selection of the dinucleophile or B component will depend to a large degree on the nature of the A component. Where the A component is a relatively low molecular weight compound of the formula (V), higher molecular weight B component may be used in the RIM process. On the other hand, Where the A reactant is a higher molecular weight prepolymer of the formula (VI) or (VII), a lower molecular weight dinucleophile will be selected.

Dinucleophiles useful in providing thermoset elastomers by RIM processing can be more particularly represented by formulas

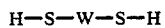  (VIII)

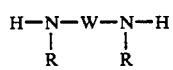  (IX)

Where R is a hydrogen atom or a lower alkyl group (e.g., and alkyl group containing 1 to 4 carbon atoms), and W is a polyether, aromatic or aliphatic, aliphatic polythioether, aliphatic polyetherthioether or a copolymer of aromatic and aliphatic polyethers or polythioethers which preferably do not sustantially degrade upon heating to temperatures of at least 350° F. and more preferably at least 400° F. More particularly W' can be represented by the formulas (X)-(XII).

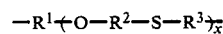  (X)

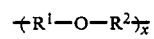  (XI)

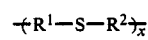  (XII)

Here $R^1$, $R^2$, and $R^3$ represent straight or branched chain alkylene or arylene groups 2 to 12 carbon atoms, x is a function of the total molecular weight divided by the molecular weight of the repeating units. The total molecular weight is most generaly between 500 and 6,000 and x is typically between 2 and 70. As a general rule, the dinucleophiles vary in reactivity as follows;

aromatic primary amines greater than aliphatic primary amines, primary amines greater than secondary amines. Mercaptans are very slow to react. Consequently, when they are used in the RIM process, a tertiary amine such as quinuclidine or triethyldiamine is added to the A component as a catalyst. Triethylamine may also be used as a catalyst but it tends to be too volitile. All of the following dinucleophiles have been used for W'.

Representative examples of dinucleophiles are provided in the following table.

TABLE

1. 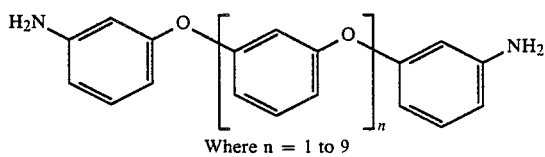
Where n = 1 to 9

2. 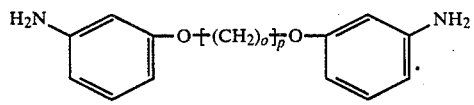

3. 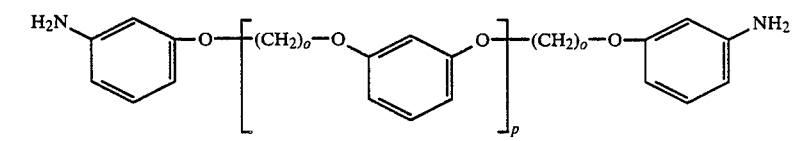

4. 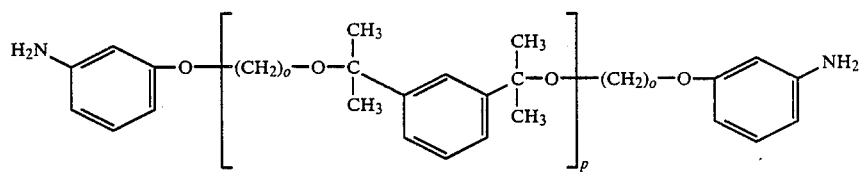
Where o = 2 to 12
p = 1 to 9

5. 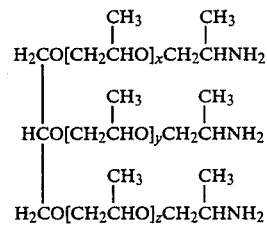

JEFFAMINE T-5000 (Texaco Corp.)
[C.A.S. Registry No. 64852-22-8]
Where x + y + z = 27

JEFFAMINE D-Series (Texaco Corp.)

6. 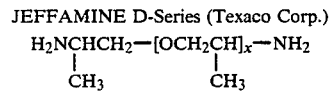

| Product | X | Mol. Wt. |
|---|---|---|
| D-230 | 2–3 | 230 |
| D-400 | 5–6 | 400 |
| D-2000 | 33 (Avg.) | 2,000 |
| D-4000 | 68 (Avg.) | 4,000 |

JEFFAMINE ED-Series (Texaco Corp.)

7. 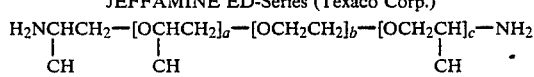

| Product | b | a + c | Mol. Wt. |
|---|---|---|---|
| ED-600 | 8.5 | 2.5 | 600 |
| ED-900 | 15.5 | 2.5 | 900 |
| ED-2001 | 40.5 | 2.5 | 2,000 |
| ED-4000 | 86.0 | 2.5 | 4,000 |
| ED-6000 | 131.5 | 2.5 | 6,000 |

UNILINK 4200 (U. O. P. Corp.)

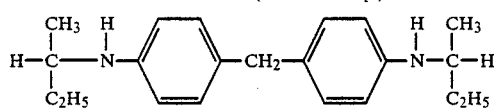

9. ONILINK 4100 (U. O. P. Corp.)

TABLE-continued

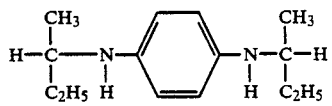

10. UNILINK XPA SERIES (U. O. P. Corp.)

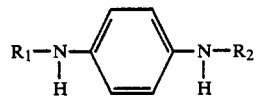

| MATERIAL CODE | $R_1$ | $R_2$ |
|---|---|---|
| XPA-23 | $C_8'$ | $C_8'$ |
| XPA-24 | $C_8$ | $C_8$ |
| XPA-28 | $C_6$ | $C_6$ |

WHERE:

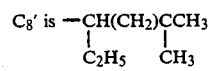

$C_8'$ is

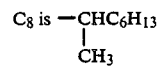

$C_8$ is

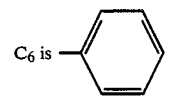

$C_6$ is

11. BIS-ANILINE M (Mitsui Petrochemicals)

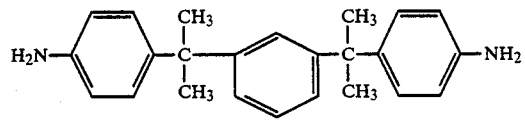

4,4'-bisaminocumyl m-benzene

12. DYTEK ™ A (Du Pont)
$H_2NCH_2CHCH_2CH_2CH_2NH_2$
         |
        $CH_3$
2-methylpentamethylenediamine 13. BHMT (Du Pont)
$H_2NCH_2(CH_2)_4CH_2NHCH_2(CH_2)_4CH_2NH_2$
bis-hexamethylenetriamine (BHMT)

14. $C_{12}$ DIAMINE (Du Pont)
$H_2NCH_2(CH_2)_{10}CH_2NH_2$
1,12-dodecanediamine 15. DPTA (Du Pont)
$NH_2CH_2CH_2CH_2NHCH_2CH_2CH_2NH_2$
dipropylenetriamine (DPTA)

16. TAPA (Du Pont)
$H_2NCH_2CH_2CH_2NCH_2CH_2CH_2NH_2$
                  |
              $CH_2CH_2CH_2NH_2$
tris(3-aminopropyl)amine (TAPA)

17. TAPED (Du Pont)
$\phantom{H_2NCH_2CH_2CH_2N}CH_2CH_2CH_2NH_2$
$\phantom{H_2NCH_2CH_2CH_2N}|$
$H_2NCH_2CH_2CH_2NCH_2CH_2NCH_2CH_2CH_2NH_2$
$\phantom{H_2NCH_2CH_2CH_2CH_2CH_2N}|$
$\phantom{H_2NCH_2CH_2CH_2CH_2CH_2N}CH_2CH_2CH_2NH_2$ N,N,N',N'-tetrakis(3-aminopropyl)ethylenediamine (TAPED).

W can also be formed from any of the polythioethers described in U.S. Pat. No. 4,366,307 to Singh et al. which is incorporated herein by reference.

These prepolymers react with dinucleophiles by a Michael addition or Diels Alder addition to afford the elastomers. For use in RIM processes, the prepolymer must be a free flowing liquid below 250° F. Preferably, this reaction proceeds under conditions compatible with the RIM process.

Typical RIM processing conditions vary because of the differences in properties of the reactants and of the chemistry of the reactions, each material requires different processing conditions. Typical prepolymer temperatures ranged from 160° to 265° F. The higher temperatures, in excess of 230° F., were avoided when ever possible for two reasons. First of all bismaleimides, biscitraconimides, bistriazolinediones, and bisvinylketones have a tendency to react with themselves. The higher the temperature the more rapid the reaction, hence, shorter pot life. This is further aggravated by the high pumping pressure of the RIM injectors. The second reason involves the seals on the RIM machine, above 265° F. these seals begin to fail rapidly. Leaking material reduces injection pressure and upsets the stoichiometric ratio between the two components.

Mixing ratio control is critically important. Because the RIM process depends on a chemical reaction to achieve its finished properties, the stoichiometric ratio of the A component to the B component is important to insure that all of the reactive sites have indeed reacted and that you have achieved the maximum possible polymer networking and molecular weight. This ratio is calculated by first calculating the equivalent weights of both the A component and the B component by dividing their molecular weights by the average number of reactive sites per molecule. The actual component weight of component A in grams divided by the equivalent weight of component A equals the equivalence of component A. The equivalence of component A times the equivalent weight of component B equals the actual weight of component B expressed in grams. The actual weights of both components A and B must be converted to volumetric units before they can be set on the RIM machine. This is done by dividing the actual weights of both components by their respective specific gravities. Very small changes can have catastrophic effects on properties. For example, a 2% percent change in a preselected 1:1.2 volumetric RIM ratio resulted in a 22% change in flexural modulus.

All currently available metering units measure the traveling speed of the piston and calculate the displaced volume flow rate of both components. It is necessary to record and control the volumetric flow rate ratio, to insure uniform polymer performance.

RIM injection pressures ranged between 2,000 and 3,500 psi. The typical reaction time was 10 seconds, followed by an 8 hour post cure of 300° F.

The dinucleophilic B component and/or the A component may be a blend to control the RIM reaction and the properties of the elastomer which is produced. It was recognized early during our research that a blend of dinucleophiles would be needed to realize all of the property requirements for power transmission belts. The dinucleophiles were selected on a temperature resistance and elastomeric tendency basis, i.e., a dinucleophile is selected which does not introduce thermally unstable units, but does introduce flexible elastomeric units into the polymer. Examples of dinucleophile blends (B side components) which have proved to be useful in this invention are:

| | |
|---|---|
| Jeffamine D-2000* | 60% |
| Jeffamine t-5000* | 20% |
| DuPont TAPED or TAPA** | 10% |
| Metsui Bis-aniline M*** | 5% |
| U.O.P. UNILINK 4200**** | 5% |
| Jeffamine D-2000* | 80% |
| DuPont TAPED** | 15% |
| 1,3-bis(3-aminophenoxyl) benzene | 5% |
| Jeffamine t-5000* | 80% |
| DuPont TAPA** | 10% |
| Metsui Bis-aniline M*** | 10% |

*A primary amine terminated aliphatic polyether available from Texaco.
**A primary amine terminated aliphatic chain available from DuPont.
***A primary aromatic diamine available from Mitsui of Japan.
****A secondary aromatic diamine available from U.O.P. Corp.

The Texaco Jeffamines are very long polyaliphaticether molecules which make up the bulk of the polymer. They are elastic, very flexible, and very soft. The D series are diamines which promote linear chain growth, were as the T series is a triamine which promotes crosslinking between chains. The crosslinkages formed by the T series Jeffamine are, however, long branched chains of about 1,800 in moleculrar weight. This crosslinkage does increase the resilience of the polymer but does not improve the low tear resistance of the polymer.

To improve the tear resistance, molecules such as DuPont TAPA, tris(3-aminopropyl)amine, or TAPED, N,N,N',N',-tetrakis(3-aminopropyl)ethylenediamine are introduced, these polynucleophiles with short, low molecular weight aliphatic branches produce very tight crosslinkages in a honeycomb like polymer network. It is this polymer networking that provides the resilience, tear resistance, and wear resistance to the polymer. The U.O.P. and Mitsui materials are hardness adjustors. They are short aromatic diamines with stiff para phenyl rings in there backbones.

It was also discovered that bismaleimides, biscitraconimides,, and bisvinylketones could also be blended to control the rate, or kinetics of the RIM reaction. It also provided a convenient means to introduce hard segments or tough segments into the polymer. Biscitraconimides react slower than bismaleimides with dinucleophiles and impart a resilience to the polymer because of its pendent methyl group. Bistriazolinediones and bisvinylketones react much more rapidly with dinucleophiles than bismaleimides and provide a means to increase the rate of reaction and reduce the post cure time and temperature. Bisvinylketone linkages are not ring structures, therefor they are more flexible than the maleimide, citraconimide, or triazolinedione structures. Examples of the most useful bismaleimide, biscitraconimide, bistriazolinedione, and bisvinylketone used are:

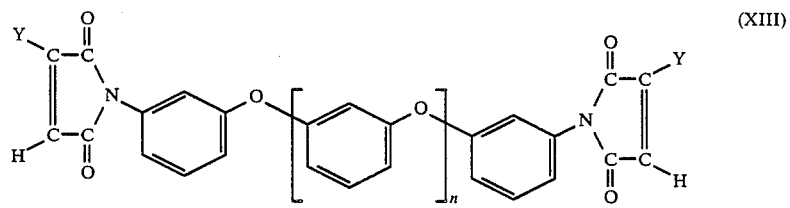

(XIII)

Where: n=1 to 5

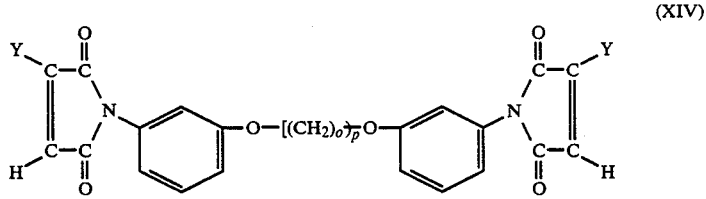

(XIV)

Where:
o = 6 and 9
p = 1, 3, and 5
y = H or methyl group

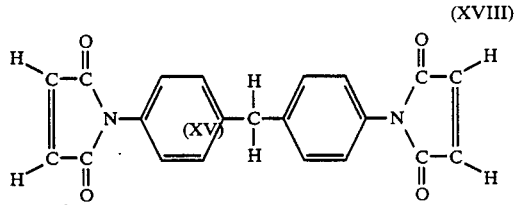

(XVIII)

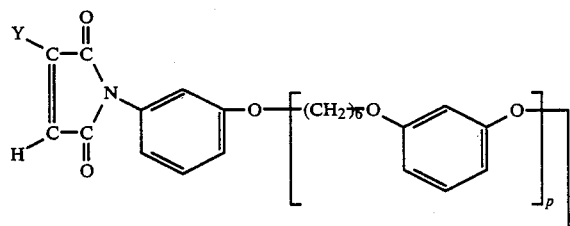

(XV)

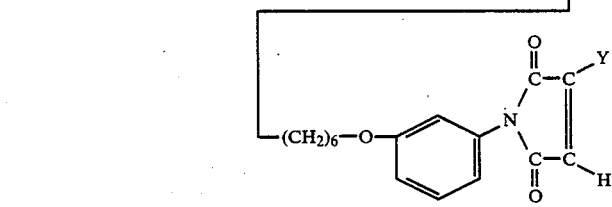

(XVI)

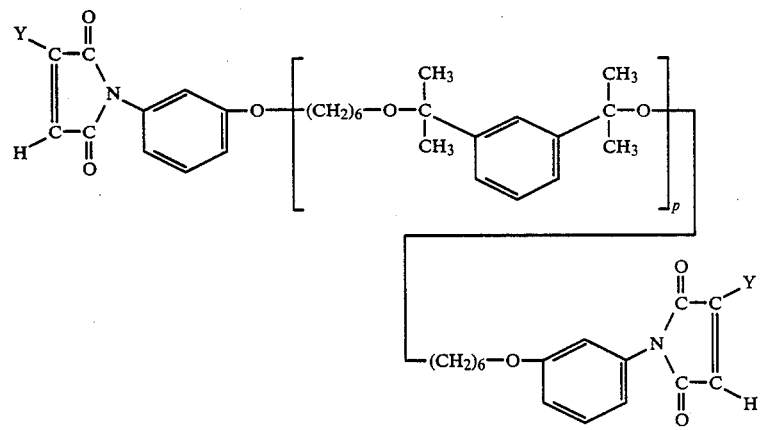

Where:
p = 3 or 5

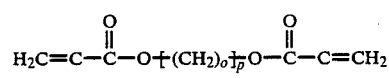

(XVIII)

Where:
o = 6 or 9
p = 1, 3, or 5

N,N',-bismaleimidodiphenyl methane (Matrimide 5258 from Ciba Giegy Corp.)

The second approach is to end cap a liquid prepolymer with a low molecular weight bismaleimide. The theory being that the end capping groups, although high melting solids, are so small compared to the body of the molecule that they have little effect on the melting point of the total molecule. This proved to be true. The bismaleimides represented by formula (V) and more specificaly by formula (XVIII) above are examples of the end capping bismaleimides used.

A number of liquid A components of the general formula (VI) were made from mercaptan terminated polythioethers and polyoxythiothers from Products Research & Chemical Corporation by the following method.

PROCEDURE: A solution containing (1.0 mole equivalent) of mercaptan terminated prepolymer, and 1 ml. of triethylamine in dry dimethylformamide (DMF) was added drop wise to a mechanically stirred solution of a bismaleimide (BMI) with the general formula (V) or more specificaly formula (XVIII) (2.1 mole equivalent) in dry DMF containing 10% of m-cresol, at 60° C. The mixture was stirred at that temperature for 24 hours, then poured into a 10 to 1 solution of methanol and acetic acid with vigorous stirring. The mixture of solvents were decanted and the viscous polymer product was washed three times with methanol, then dried under reduced pressure. The bismaleimide end capped prepolymer then could be reacted with low molecular dinucleophiles such as DuPont DYTEK A (2-methylpentamethylenediamine) blended with TAPA (tris(3-aminopropyl)amine) and/or TAPED N,N,N',N',-tetrakis(3-aminopropyl)ethylenediamine). Examples of Products Research Corporation prepolymer blends are:

|           |     |
|-----------|-----|
| RW-2063-70 | 80% |
| RW-2064-70 | 20% |
| RW-2064-70 | 80% |
| RW-2065-70 | 20% |

RW-2063-70 is a mercaptan terminated polyoxythioether prepolymer with an average molecular weight of 6,500 and an average functionality of 2.75.

RW-2064-70 has the same general structure as RW-2063-70 differing only in the molecular weight 2,850 and the functionality 2.0.

RW-2065-00 is a short chain dimercaptan with a molecular weight of 154.3, functionality of 2.0, and the formula $HSCH_2CH_2SCH_2CH_2SH$.

Typical nucleophiles (B components) used to produce elastomers by reaction with A components prepared by endcapping liquid prepolymers were piperazine, 2-methylpiperazine, methylene dianiline, DuPont DPTA (dipropylenetriamine), TAPA (tris(3-aminopropyl)amine), TAPED (N,N,N',N',-tetrakis(3-aminopropyl)ethylenediamine), Cis-diaminocyclohexane and 1,12-dodecanediamine. This second method was used considerably during the early polymer evaluation studies because it was something we could do quickly to obtain polymer samples.

Another useful class of dinucleophiles is biscyclopentadienyl alkanes and, more particularly cyclopentadienyl alkanes having 1 to 15 carbon atoms in the alkylene bridge between the cyclopentadienyl rings. The preparation of these compounds is illustrated in

GENERAL PROCEDURE FOR THE PREPARATION OF BISCYCLOPENTADIENYL ALKANES

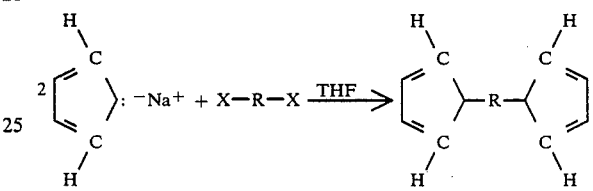

sodium salt of + dihalide→bis-cyclopentadienylalkane cyclopentadienyl

Where x=Cl, Br, or I preferably Bromine

These compounds react with bismaleimide, biscitraconimide, and bistriazolinedione terminated prepolymers in a Diels Alder addition with the formation of a polynorbornene elastomer. The basic reaction scheme is shown below.

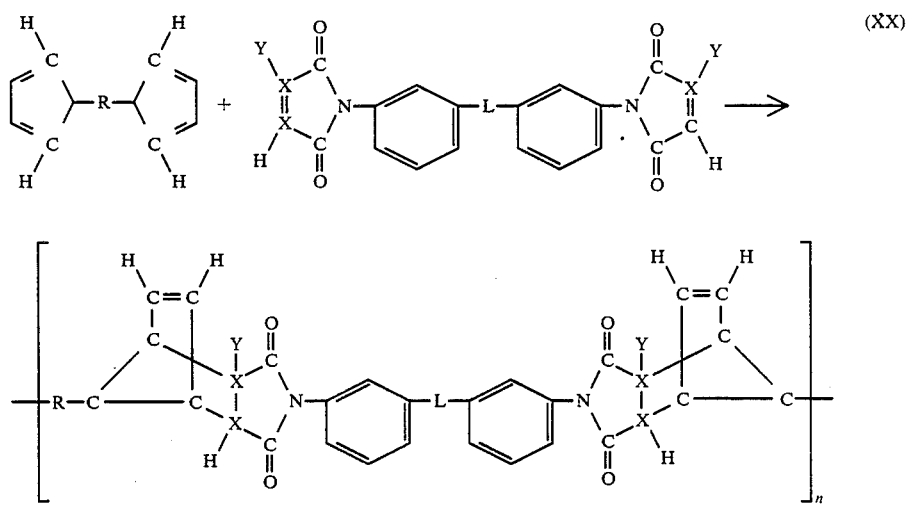

The prepolymers of the present invention can also be reacted with biscyclopentadienones to produce a RIM processable polyhydrophthalimide. This reaction is shown below.

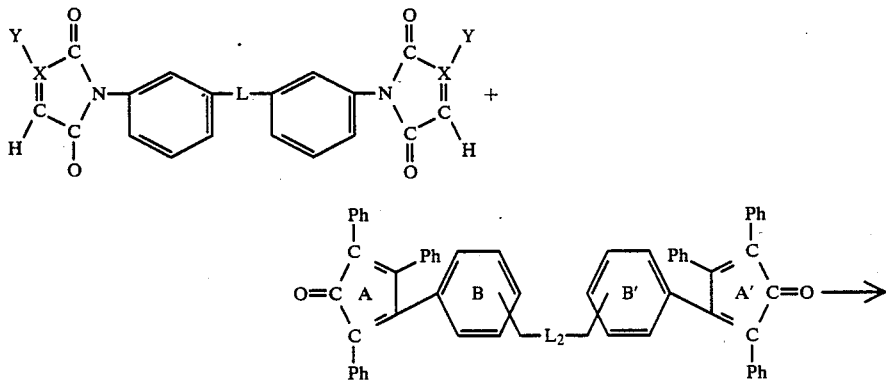

(XXI)

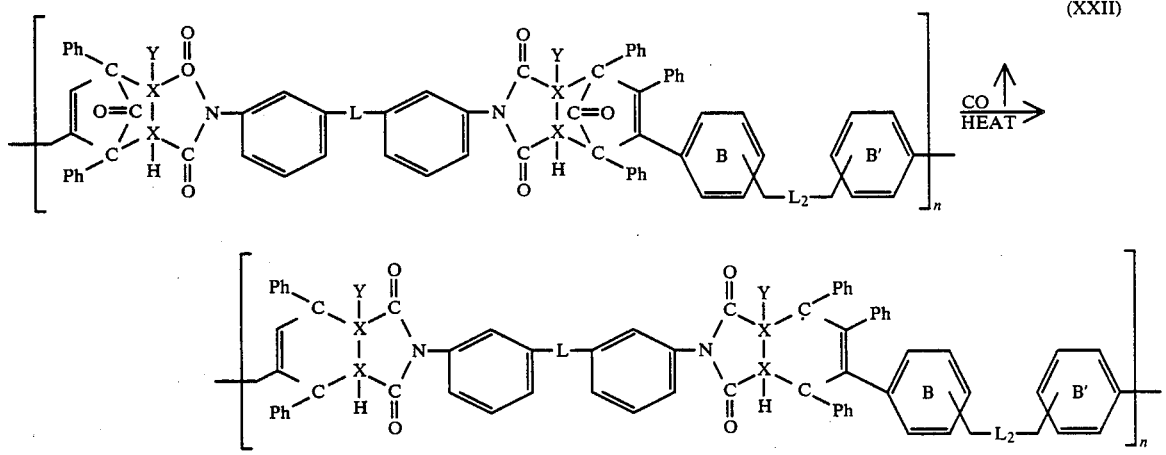

(XXII)

Note: The L₂ groups can be attached to the phenyl rings, B and B', in para or meta position, prefereably in meta position.

Where:
Ph = phenyl $C_6H_5$
L = represents a flexible linking group having one of the following structures.

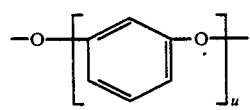

Where u is 1 to 7 and preferably 1,3, or 7 and t is 1 to 5 and preferably 1 or 3.

The linking group L is usually a divalent, however, trivalent and tetravalent linking groups such as

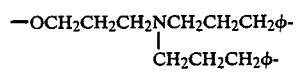

tris(3-etherpropyl)amine

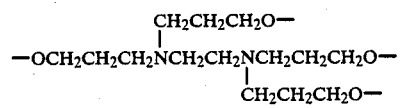

N,N,N',N',-tetrakis(3-etherpropyl)ethylenediamine are also possible.

This reaction is desirable because it proceeds with the loss of carbon monoxide which makes the reaction irreversible.

(XXIII)

Where:
$L_2$ = represents a flexible linking group of the same group of structures as L on page 24.
Ph = represents a phenyl group.

Compounds of the formula (XXIII) can be prepared as illustrated in synthesis Example 5.

For use in power transmission belts, the elastomers of the present invention must have the tensile, resiliency, solvent resistance and flexural characteristics which provide good service life as well as high temperature resistance. Elastomers which are particularly preferred in these applications have the following properties.

| | |
|---|---|
| Tensile (kpsi) | 1.5 to 3.5 |
| Elongation (%) | 150 to 300 |
| Flexural Modulus (kpsi) | 10.0 to 30.0 |
| Shore hardness | 75A to 45D |
| Degradation temp. (in air) | $\geq 600°$ F. |

RIM is the reaction of two highly reactive components insitu in a mold. In accordance with the present invention, the bismaleimide, biscitraconimide, bistriazolinedione, or bisvinylketone and the dinucleophile are impingement mixed and injected into a mold in a conventional manner where they react to form the thermally stable elastomers of the present invention.

The invention is illustrated in more detail by way of the following non-limiting examples.

Metsui Petrochemicals Corp., (2.1 mole equiv.) in dry DMF, containing 10% of m-cresol and 1 ml. of triethylamine, at 60° C.

The mixture was stirred at that temperature for 24 hours, then poured into a 10 to 1 solution of methanol and acetic acid with vigorous stirring: The solvents were decanted from the viscous prepolymer product and washed three times with methanol, then dried in a rotorevaporator under vacuum at 60° C. for 4 hours.

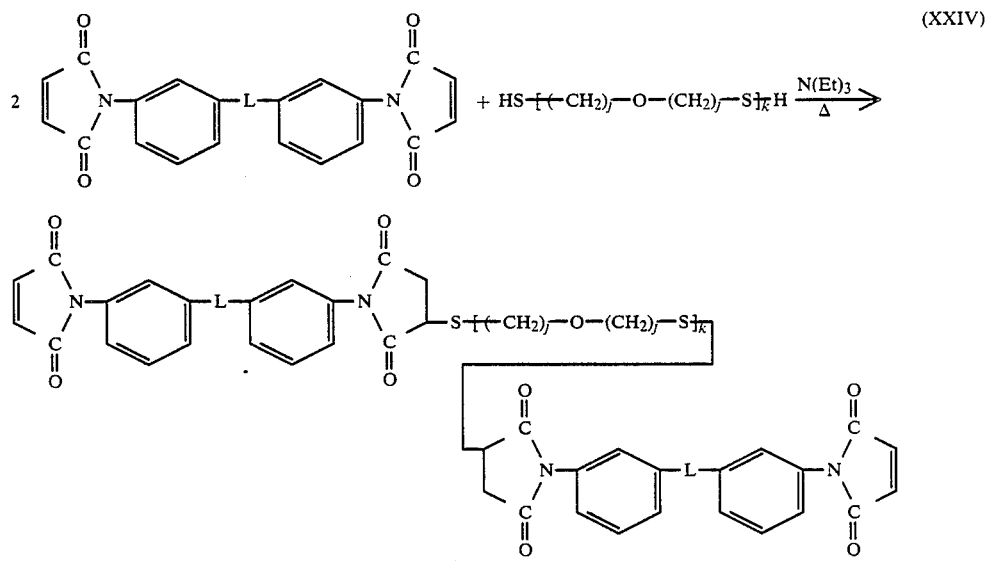

(XXIV)

SYNTHESIS EXAMPLE 1

ENDCAPPING OF DIMERCAPTANS

Dimercaptodiethylsulfide (7.7 gr. or 0.1 mole equivalence) containing a few drops of triethylamine was added drop wise to a solution of (40.0 gr. or 0.22 mole equivalence) of N,N',-bismaleimidodiphenyl methane, Matrimide 5258 available from Ciba Giegy Corp., in 500 ml. of freshly distilled m-cresol. The mixture was stirred at room temperature for 2 hours, then warmed to 60° C. A solution of (303.7 gr. or 0.213 mole equivalence) of RW-2064-70, a mercaptan terminated polythioether prepolymer available from Products Research Corp., in 500 ml. m-cresol was added slowly to the mixture and the resulting mixture was mechanically stirred for 20 to 24 hours at 60° to 70° C., then for an additional 2 hours 100° C. The mixture was cooled to 80° C. and (37.8 gr. or 0.21 mole equivalence) of 1,1'-methylene di 1,4-phenylene bis-maleimide was added, then stirred overnight. The resulting mixture was poured into a solution of methanol containing 10% acetic acid in a stainless steel Waring blender and the viscous polymeric material was broken to form a resinous liquid polymer, separated in a separatory funnel from the methanol, the prepolymer was washed three times with methanol, and dried in a rotoevaporator under vacuum at 60° C. for 3 hours.

SYNTHESIS EXAMPLE 2

ENDCAPING OF DIMERCAPTANS

A solution of 0.1 mole equivalent of a mercaptan terminated liquid polymer RW-2066-70, available from Products Research Corp., in 1 liter dry DMF was added dropwise to a mechanically stirred solution of 4,4'-bismaleimidocumyl metabenzene, available from Where:
j=1, 2, 3, 4 and sometimes 6
k=38 to 91

The resulting bismaleimide endcapped prepolymer was reacted with various diamines such as DuPont $C_{12}$ DIAMINE, 1,12-dodecanediamine, or DuPont TAPA, tris(3-aminopropyl)amine, or 2-methyl piperazine to yield amorphorous dark brown to light amber thermoset plastic resins.

SYNTHESIS EXAMPLE 3

Preparation of polyether diamines

In a 500 ml. round bottom three neck flask out fitted with a refluxing condenser, mechanical stirrer, and addition separatory funnel was added 150 ml. DMAC, 15.19 gr. of potassium carbonate, and 32.18 gr. of meta chloroaniline. This mixture was stirred and heated to 150° C. After the mixture had a chance to stabilize at 150° C. for 30 minutes 12.43 gr. of hexanediol was added drop wise to the flask over a 1 hour period. The flask was allowed to reflux overnight or 18 hours. The flask was then allowed to cool down to room temperature. The contents were filter and the solid potassium carbonate was discarded. The filtrate was then mixed with water and 100 ml. of chloroform. The chloroform diamine layer was washed with water 4 times. The organic layer was then distilled under vacuum. The chloroform and water fractions were discarded, the last fraction was saved. The reaction yield was 83.0% of 6,6'-diamino m-phenoxyhexane. This nucleophilic aromatic substitution reaction was used to make a variety of aromatic and aromatic aliphatic ether diamines.

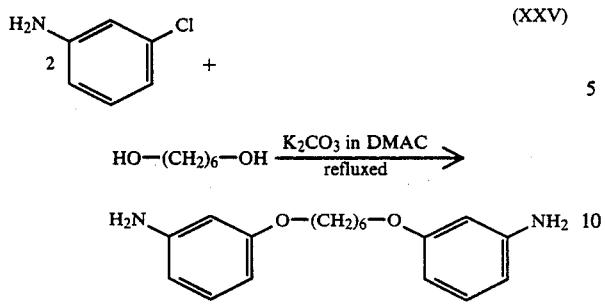

(XXV)

SYNTHESIS EXAMPLE 4
Preparation of liquid bisamleimides

To a vigorously stirred solution of 6,6'-diamino m-phenoxyhexane (0.1 mole) in acetone under a nitrogen atmosphere, maleic anhydride (0.22 mole) was added, the temperature outside being maintained at a constant 20° C. The pale yellow solid of bis-maleamic acid soon obtained on addition of maleic anhydride, was vigorously stirred for a further 0.5 hour to complete the reaction. To the continuously stirred suspension of compound in acetone were added acetic anhydride (70 ml., excess) and fused sodium acetate (5 to 6 gr.), and the acetone was allowed to reflux. Refluxing and stirring were continued until the solution became clear (2 to 2.5 hours).

The clear brownish yellow solution was poured into ice water and 100 ml. of chloroform was added and the whole thing was shaken in a separatory funnel. The organic layer was washed with water containing sodium bicarbonate 4 times by shaking it in a separatory funnel. The organic layer was then passed through a filtration chromatography column containing silica gel. The chloroform was the removed by distillation under vacuum in a rotoevaporator. The resulting 6,6'-bis-maleimido m-phenoxyhexane is a yellowish orange viscous liquid at room temperature.

SYNTHESIS EXAMPLE 5
Preparation of the biscyclopentadiene

A mixture of meta-dibromobenzene (1 mole), triphenyl phosphine (20 gr.), copper iodide (3 gr.), and palladium (II) acetate (1 gr.), in 1 liter of dry triethylamine is heated and stirred at 100° C. Phenylacetylene (2.5 moles), is added slowly and the resulting mixture is refluxed for 8 hours. The mixture is cooled and the solid product washed with ether, then with water, and methanol. The product I, is then air-dried and used in the next step.

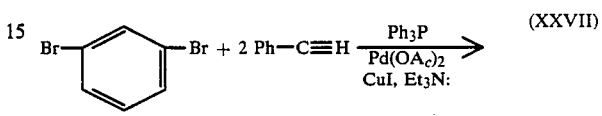

(XXVII)

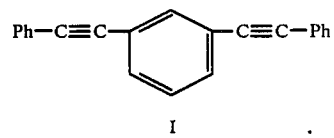

I

A mixture of potassium permanganate (3 mole), 1,4-bis(phenylethynyl)arene, product I (1 mole), water (6 liters), methylene chloride (5 liters), acetic acid (400 ml.), and phase transfer agent (Adogen 464 methyltrialkyl ($C_8$-$C_{10}$)-ammonium chloride available from Aldrich Chemical Co.) is mechanically stirred and refluxed for 6 hours. After cooling, sodiumhydrogensulfite (20 gr.) is added slowly to reduce any unreacted permanganate. After 15 minutes the solution is acidified with 1 liter of concentrated hydrochloric acid and the precipitated manganese dioxide is reduced by addition of excess concentrated sodium hydrogensulfite solution. The aqueous phase is separated and extracted with dichloromethane (3 liters). The combined organic layer is washed with 5% sodium hydroxide solution, dried magnesium sulfate, filtered, and concentrated to give the product II.

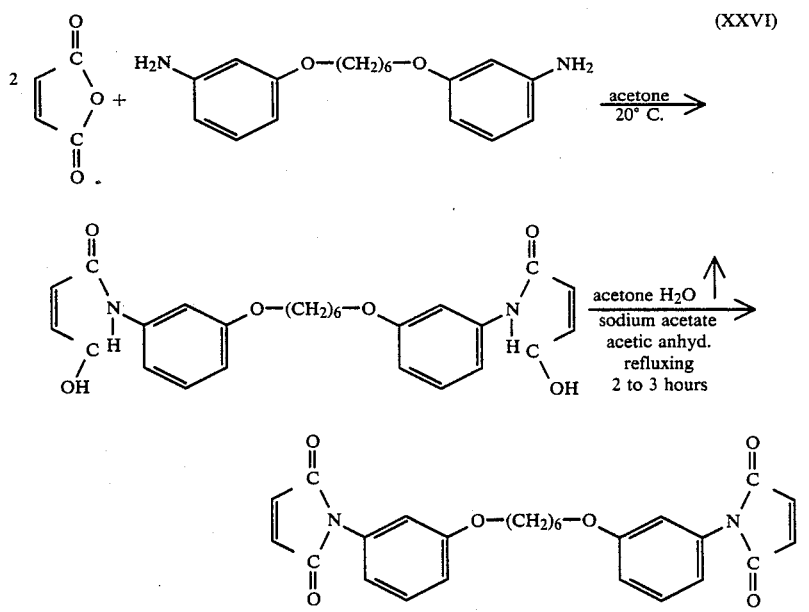

(XXVI)

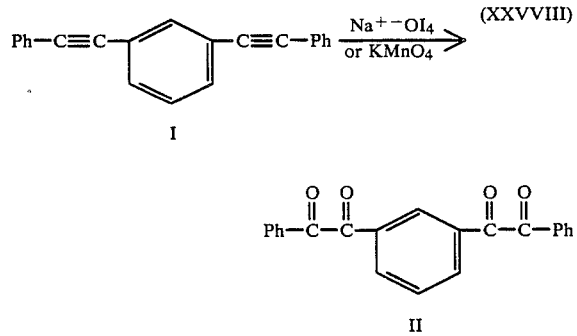

Step 3:

A one mole equivalent sample of product II and two mole equivalent of dibenzylketone is heated for 4 hours in a mechanically stirred dichlorobenzene solution. The mixture is diluted with addition of hexane and the solid product is filtered, washed with hexane and dried. Purification of this product may be carried out by recrystallization from acetone or methyl ethyl ketone.

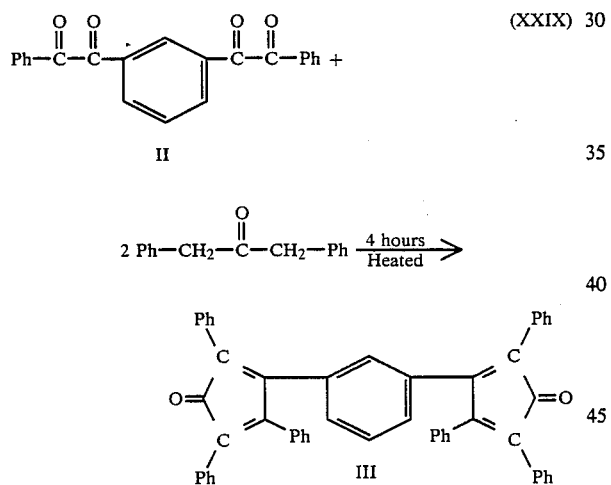

Where:
Ph=phenyl rings

SYNTHESIS EXAMPLE 6

Preparation of biscyclopentadienyl alkane

To a solution of sodium cyclopentadienyl (2 mole equivalence), in dry tetrahydrofuran (THF) under nitrogen atmosphere and ice bath temperature, is added drop wise a solution of 1,6-dibromohexane, selected from those with the general form shown below, (1 mole equivalence), in dry THF. When the addition is complete, the mixture is stirred at 5° to 10° C. for 6 to 12 hours. The resulting solution is poured into an ice-cold dilute hydrochloric acid (5%) and the product is isolated by filtration or extraction.

GENERAL PROCEDURE FOR THE PREPARATION OF BIS-CYCLOPENTADIENYL ALKANES

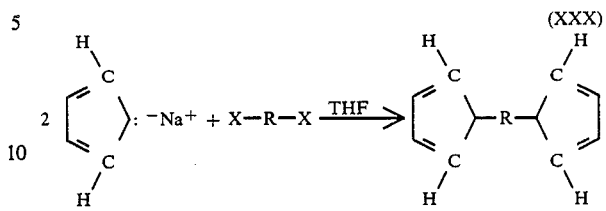

sodium salt of +dihalide→bis-cyclopentadienylalkane cyclopentadienyl

Where:
X=Cl, Br, or I and preferably Cl or Br

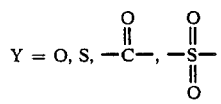

$$Y = O, S, -\overset{O}{\underset{\|}{C}}-, -\overset{O}{\underset{\underset{O}{\|}}{\overset{\|}{S}}}-$$

Where:
n=1 to 15
m=1 to 6

SYNTHESIS EXAMPLE 7

Preparation of activated bisvinylketone

To a solution of suberoyl chloride, ClCO(CH$_2$)$_6$COCl, (1 mole equivalence) and aluminum chloride (2.2 mole equivalence) in methylene chloride at 0° C., is added drop wise a solution of trimethylvinyl silane (2.4 mole equivalence) in methylene chloride. The mixture is stirred at 0° to 5° C. for 6 to 10 hours, then poured in ice-cold 10% hydrochloric acid. The mixture is shaken in a separatory funnel, methylene chloride layer is washed with water, dried (MgSO4). The solution is then filtered and the methylene chloride is distilled under vacuum in a rotoevaporator at 50° C. to give bisvinylketone product.

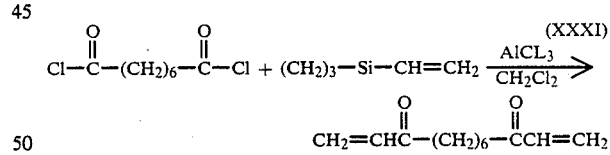

Having described the invention in detail and by reference to specific embodiments thereof, it will be apparent that numerous modifications are possible without departing from the spirit of the invention as defined in the following claims.

What is claimed is:

1. A polyimide having a repeating unit of the formula (I), (II), or (III):

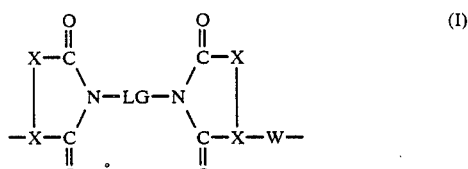

-continued

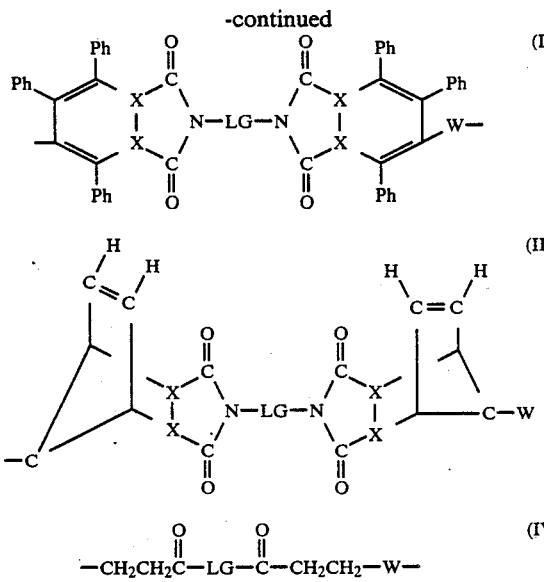

where LG is a linking group and W is an oligomeric chain selected from the group consisting of polyether, a polythioether, a polyetherthioether, a polycarbonyl, a polysulfonyl, and copolymers thereof.

2. The polyimide of claim 1 wherein LG is a group of the formula:

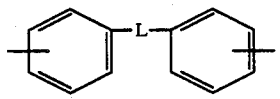

where L represents a flexible linking group.

3. The polyimide of claim 2 wherein L is selected from the group consisting of:

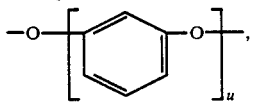

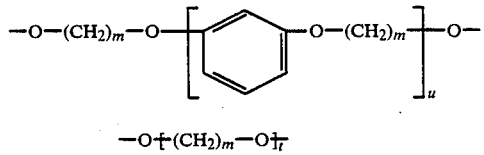

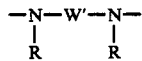

where u is 1 to 7, t is 1 to 5, and m is 1 to 12.

4. The polyimide of claim 3 wherein W is represented by the formula:

—S—W'—S—

where R is a hydrogen atom or a lower alkyl group, and W is a straight or branched chain polyether, polythioether, or polyetherthioether.

5. The polyimide of claim 4 wherein W includes a repeating unit selected from the group consisting of:

$-R_1-O-R_2-S-R_3-$ $-R_1-O-R_2-$ $-R_1-S-R_2-$ where $R_1$, $R_2$, and $R_3$ may be the same or different and represent a straight or branched chain alkylene group having 2 to 12 carbon atoms, an m-phenylene group or a p-phenylene group.

6. The polyimide of claim 4 wherein W is represented by the formula:

$-S-R_1[-O-R_2-S-R_3-]_x-S-$ or the formula:

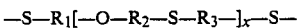

where x is 2 to 80 and R, $R_1$, $R_2$, $R_3$ may be the same or different and represent a straight or branched chain alkylene group having 2 to 12 carbon atoms, an m-phenylene group or a p-phenylene group.

7. The polyimide of claim 3 wherein W is

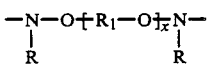

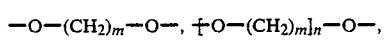

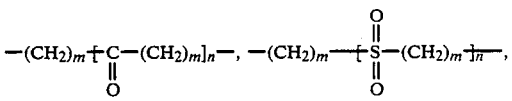

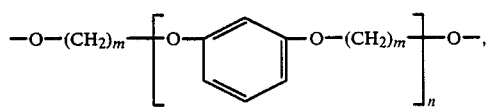

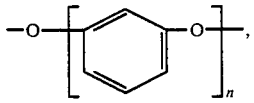

x is a carbon atom or a nitrogen atom and when x is a carbon atom, one carbon atom may be substituted by a methyl group;
m is 1 to 12; and
n is 1 to 5.

8. The polyimide of claim 1 wherein said polyimide is characterized by a tensile strength of about 1.5 to 3.5 kpsi.

9. The polyimide of claim 1 wherein said polyimide is characterized by an elongation of about 150 to 300%.

10. The polyimide of claim 1 wherein said polyimide is characterized by a flexural modulus of about 10 to 30 kpsi.

11. The polyimide of claim 1 wherein said polyimide is characterized by a shore hardness of 75A to 45D.

12. The polyimide of claim 1 wherein said polyimide is characterized by a degradation temperature in air than 600° F.

13. The polyimide of claim 1 of the formula (I).

14. The polyimide of claim 5 of the formula (I).

15. A bismaleimide terminated prepolymer of the formula (V), (VI), or (VII):

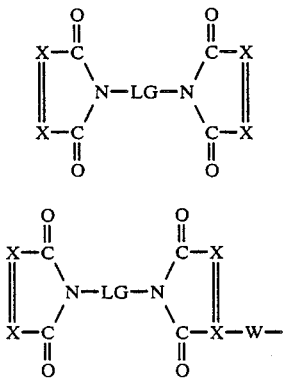 (V)

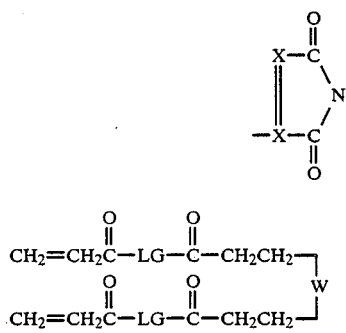 (VI)

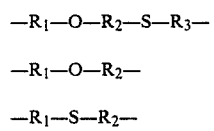 (VII)

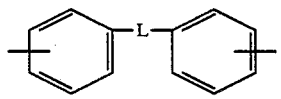

where LG is a linking group and W is an oligomeric chain selected from the group consisting of a polyether, a polythioether, a polyetherthioether, a polycarbonyl, a polysulfonyl, and copolymers thereof.

16. The prepolymer of claim 15 wherein LG is represented by the formula:

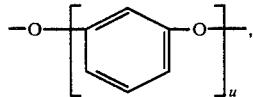

where L represents a flexible linking group.

17. The prepolymer of claim 16 wherein L is selected from the group consisting of

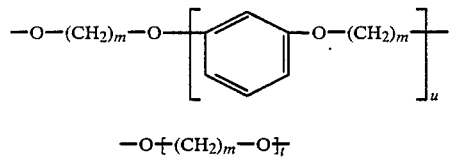

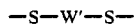

where u is 1 to 7, t is 1 to 5, and m is 1 to 12.

18. The prepolymer of claim 16 wherein W' is a straight or branched chain moiety represented by the formula:

—S—W'—S—

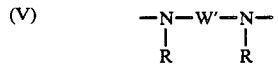

where R is a hydrogen atom or a lower alkyl group, and W' is a straight or branched chain polyether, polythioether or polyetherthioether chain.

19. The prepolymer of claim 18 wherein W' includes a repeating unit selected from the group consisting of:

—R$_1$—O—R$_2$—S—R$_3$—

—R$_1$—O—R$_2$—

—R$_1$—S—R$_2$— where R$_1$, R$_2$, and R$_3$ represent a straight or branched chain alkylene group having 2 to 12 carbon atoms, an m-phenylene group or a p-phenylene group.

20. The prepolymer of claim 17 wherein W' is a polyetherthioether containing unit represented by the formula:

—S—R$_1$—[—O—R$_2$—S—R$_3$—]$_x$—S— or a polyether containing unit represented by the formula:

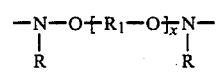

where x is 2 to 80 and R$_1$, R$_2$ and R$_3$ represent a straight or branched chain alkylene group having 2 to 12 carbon atoms, an m-phenylene group or a p-phenylene group.

21. The prepolymer of claim 17 wherein

—O—(CH$_2$)$_m$—O—, $\pm$O—(CH$_2$)$_m$]$_n$—O—,

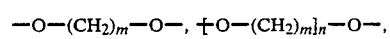

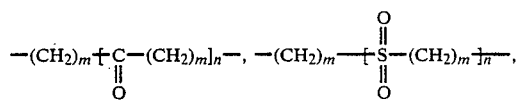

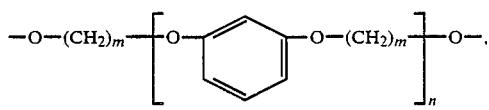

x is a carbon atom or a nitrogen atom and when x is a carbon atom, one carbon atom may be substituted by a methyl group;
m is 1 to 12; and
n is 1 to 5.

22. The prepolymer of claim 15 of the formula (V).
23. The prepolymer of claim 15 of the formula (VI).
24. The prepolymer of claim 15 of the formula (VII).
25. The prepolymer of claim 16 where L is selected from the group consisting of

-continued and

-continued
$$-OCH_2CH_2CH_2NCH_2CH_2NCH_2CH_2CH_2O-$$
with $CH_2CH_2CH_2O-$ branches on the nitrogens.

26. An temperature resistant elastomer prepared by reacting a bismaleimide, biscitraconimide, bistriazolinedione, or bis-vinylketone terminated prepolymer as defined in claim 15.

27. In a process for reaction injection molding, the improvement which comprises reacting a prepolymer as defined in claim 15 with a dinucleophile.

* * * * *